United States Patent [19]
Bleier et al.

[11] 3,950,972
[45] Apr. 20, 1976

[54] BICYCLE LOCK

[75] Inventors: Andrew Y. Bleier, Chicago; Philip J. Burnstein, Skokie; John J. Aiken, Bolingbrook, all of Ill.

[73] Assignee: Bik-Lok, Inc., Chicago, Ill.

[22] Filed: May 5, 1975

[21] Appl. No.: 574,425

[52] U.S. Cl. .................................. 70/234; 70/49
[51] Int. Cl.² ........................................ B62H 5/00
[58] Field of Search ............... 70/30, 49, 58, 227, 70/234

[56] References Cited
UNITED STATES PATENTS

| 436,800 | 9/1890 | Parke | 70/227 |
| 527,418 | 10/1894 | Free et al. | 70/227 X |
| 639,196 | 12/1899 | Fehling | 70/49 |
| 2,574,967 | 11/1951 | Gossner | 70/49 |

FOREIGN PATENTS OR APPLICATIONS

| 123,470 | 11/1948 | Sweden | 70/58 |
| 866,462 | 5/1941 | France | 70/234 |

Primary Examiner—Albert G. Craig, Jr.
Attorney, Agent, or Firm—Anthony S. Zummer

[57] ABSTRACT

A bicycle lock which is adapted for fixedly mounting on a bicycle is the subject matter herein. The subject bicycle lock includes a housing, which has a shackle receptacle rotatably mounted therein. An elongated flexible shackle has one end fixed to the shackle receptacle, and the other releasably connectable to the housing. The flexible shackle is windable upon the shackle receptacle for storage in the housing. A ratchet wheel is fixed to the shackle receptacle for rotation therewith. A lock pin is connected to the other end of the flexible shackle, and is positionable in the housing. The lock pin has a dog, which is engageable with the ratchet wheel to limit rotation of the ratchet wheel and the shackle receptacle to one direction for winding the flexible shackle onto the receptacle. The dog is removable from the housing with the lock pin to allow the flexible shackle to be unloaded from the shackle receptacle. A lock is mounted in the housing, and is engageable with the lock pin to hold selectively the lock pin in the housing, with the dog in a position for engagement with the ratchet wheel.

12 Claims, 6 Drawing Figures

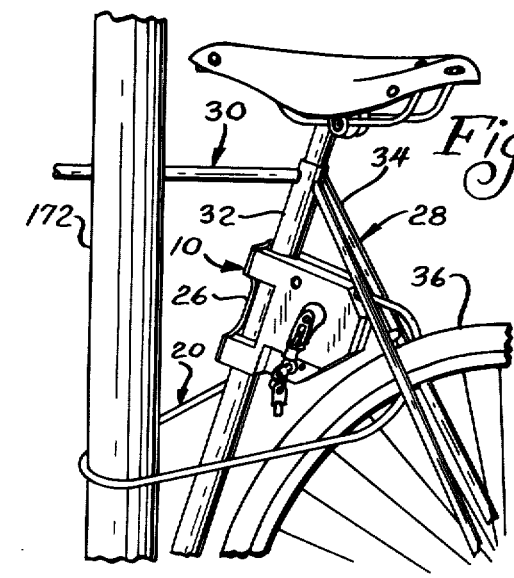
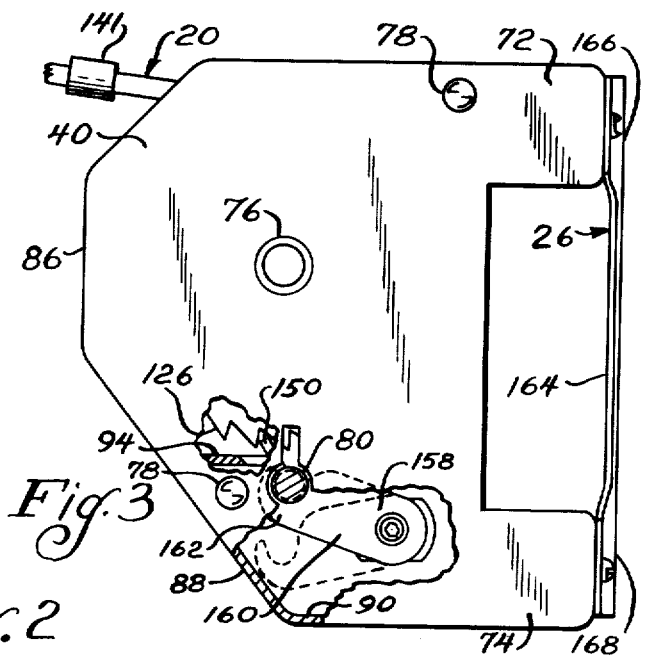
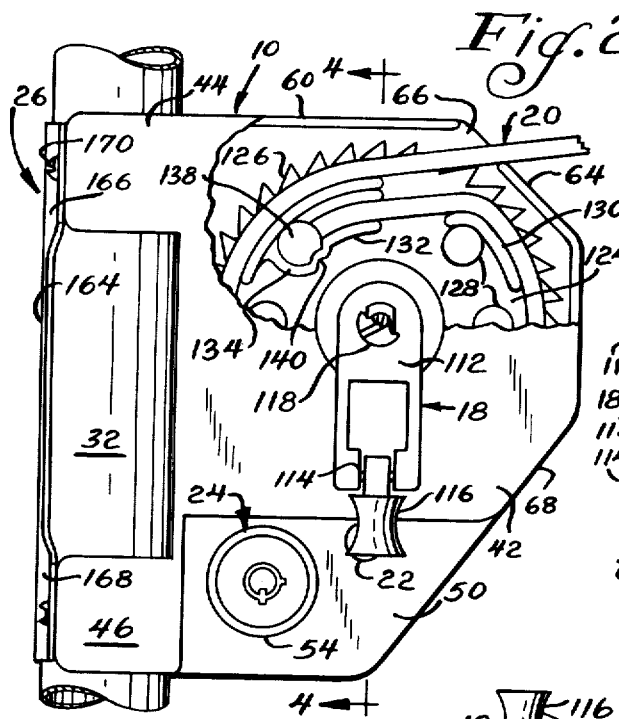
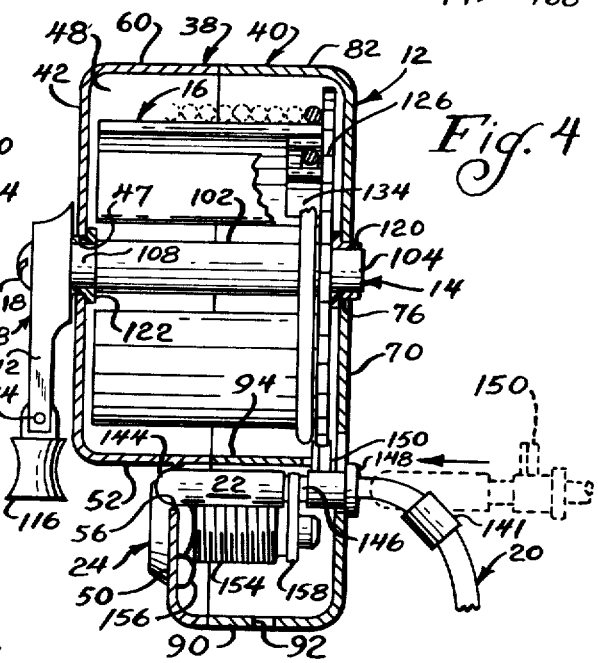
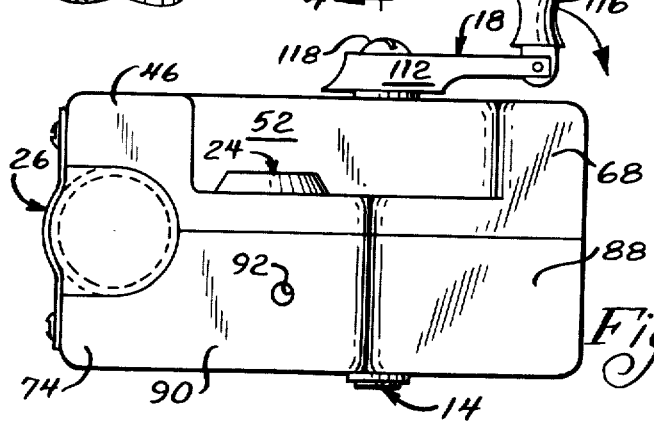
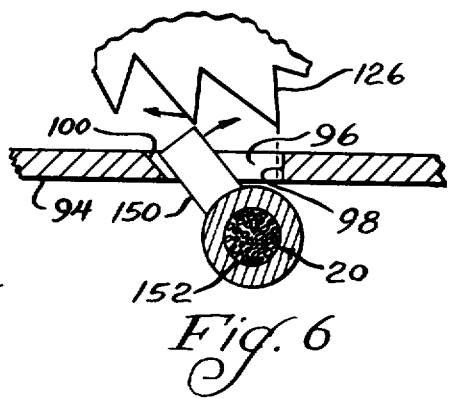

BICYCLE LOCK

BACKGROUND OF THE INVENTION

In many instances, it is desirable to provide a lock for securely locking a bicycle to a stationary object. It is also desirable to provide a lock which allows various parts and subassemblies of the bicycle to be locked together, such as, locking the rear wheel and the front wheel to the frame, as well as locking the frame to a stationary object. One method of providing such a means for locking a bicycle together is to use a cable or chain with a padlock. The storage of a cable or chain provides a problem to a bicycle rider. Locks having an extendible flexible shackle are known; and such locks are disclosed in U.S. Pat. No. 1,069,646 to Richter and U.S. Pat. No. 2,933,915 to Gossner. The prior art locks having a flexible shackle are not particularly adapted for use on a bicycle. These locks ordinarily lock the shackle at a selected length, but provide no means for retrieving the shackle into a housing once the lock is locked.

SUMMARY OF THE INVENTION

The present invention relates to a bicycle lock. The instant bicycle lock is particularly adapted to be secured to a portion of a bicycle, such as a frame. The lock includes a housing adapted for mounting on the frame of the bicycle. The housing has a shackle receptacle rotatably mounted therein. An elongated flexible shackle has one end fixed to the shackle receptacle, and is windable upon the shackle receptacle for storage thereon. The other end of the shackle is free, and may be releasably locked to the housing. A ratchet wheel is fixedly connected to the shackle receptacle for rotation therewith. The flexible shackle has a lock pin fixed to the free end thereof. The lock pin is releasably positionable in the housing. The lock pin has a dog formed integral therewith, which is positionable in the housing adjacent to the ratchet wheel for engagement therewith to limit rotation of the ratchet wheel and the shackle receptacle to one direction for winding the flexible shackle onto the receptacle. The flexible shackle urges the dog into engagement with the ratchet wheel. A lock is mounted in the housing. The lock is engageable with the lock pin to hold the lock pin in the housing. It is a principal object of the present invention to provide an improved bicycle lock construction, which includes a ratchet wheel which may be selectively connected to a dog to limit rotation only in one direction to allow a flexible shackle to be wound into the housing when the flexible shackle has its free end locked to the housing.

It is another object of the present invention to provide an improved construction for a bicycle lock, which allows the bicycle lock to be mounted on a bicycle frame, with an elongated flexible shackle stored therein; but which may be readily extended quickly and conveniently to lock the bicycle.

It is another object of the herein-disclosed invention to provide an improved bicycle lock construction, which may be easily and conveniently manufactured.

It is a still further object of this invention to provide an improved bicycle lock construction, which may be easily secured to a bicycle.

Other objects and uses of the present invention will become readily apparent to those skilled in the art upon a perusal of the accompanying drawing in light of the following specification.

BRIEF DESCRIPTION OF THE DRAWING

FIG. 1 is a perspective view of a bicycle lock embodying the present invention, shown mounted on a portion of a bicycle, with a portion of the bicycle lock being connected to a stationary object;

FIG. 2 is a side elevational view of the bicycle lock shown in FIG. 1, but with a portion broken away in order to show better the interior construction of the lock;

FIG. 3 is a side elevational view of the bicycle lock shown in FIG. 1, showing the other side of the bicycle lock, but with a portion broken away in order to show better the interior construction thereof;

FIG. 4 is a cross-sectional view taken on Line 4—4 of FIG. 2, showing the construction of the bicycle lock;

FIG. 5 is a bottom view of the bicycle lock shown in FIG. 1; and

FIG. 6 is an enlarged fragmentary side elevational view of a portion of the bicycle lock of FIG. 1, showing a portion of a dog of a lock pin and its interrelationship with a ratchet wheel, which constitutes a part of the lock.

DESCRIPTION OF THE PREFERRED EMBODIMENT

Referring now to the drawings, and more particularly to FIGS. 2 and 4, it may be seen that a bicycle lock generally indicated by numeral 10 is shown therein. The bicycle lock 10 generally includes a housing 12; a shaft 14 rotatably mounted in the housing; a drum 16 mounted on the shaft 14; a crank 18 connected to the shaft 14; a flexible shackle 20 connected to the drum; a lock pin 22 connected to one end of the flexible shackle 20; a lock 24 mounted in the housing and being selectively engageable with the lock pin; and a support plate 26 for securing the housing to a portion of the bicycle.

Looking now to FIG. 1, a portion of a conventional bicycle generally indicated by numeral 28 is shown therein. The bicycle is shown herein solely for purposes of illustrating the operation of the subject bicycle lock. The bicycle generally includes a frame 30, having a seat post 32 and a rear fork 34. A rear wheel 36 is rotatably mounted on the rear fork 34.

The housing 12 generally consists of two die-cast aluminum halves, a lock side 38, and a pin side 40. The lock side 38 includes a side wall 42, which has an upper mounting pedestal 44 formed integral therewith, and a lower mounting pedestal 46 also formed integral therewith. Side wall 42 has a shaft aperture 47 adjacent to its center. Lock side 38 includes a drum shell cavity 48, which rotatably receives drum 16. A lock plate 50 is parallel to the side 48. A spacer plate 52 integrally joins lock plate 50 and side 48. Lock plate 50 includes a lock aperture 54, which receives lock 24; a pin aperture 56, which receives the lock pin 22; and a pair of rivet receptacles 58, for receipt of rivets, which hold the halves together. The lock side also includes a top plate 60, formed integral with side 42. An end plate 62 is also formed integral with the side 42. An upper bevel plate 64 is formed integral with the side 42, and is also formed integral with the end plate 62. A cable slot 66 is formed in the bevel plate 64. A lower bevel plate 68 is formed integral with the side 42 and the end plate 62.

Pin side 40 includes a side plate 70, which has an upper mounting pedestal 72 formed integral therewith and a lower mounting pedestal 74 formed integral therewith. Side plate 70 includes a shaft aperture 76 and a pair of rivet receptacles 78 for receipt of rivets. The plate 70 also has a keyhole aperture 80, which receives lock pin 22. A top plate 82 is formed integral with the side 70, and registers with the top plate 60. An upper bevel plate 84 is formed integral with the side 70, and has a cable slot, which slot registers with the cable slot 66 of the lock side. An end plate 86 is formed integral with side 76 and with pedestal 74. A lower bevel plate 88 is also formed integral with the side 70. A bottom plate 90 is formed integral with the lower bevel 88 and with the side 70. The bottom plate 90 includes a drain aperture 92. A web 94 is formed integral with the side 76. The web 94 includes a dog aperture 96, which includes a forward stop surface 98 and a rear stop surface 100.

The shaft 14 includes a shaft body 102, with a bearing shank 104 formed integral with one end thereof. A drive end 106 on the other end of the body includes a bearing portion 108 and a crank end 110, upon which is mounted crank 18.

Crank 18 includes a bifurcated arm 112, which has a handle shaft 114 contained therein. A handle 116 is pivotedly mounted on the shaft 114. The crank is secured to the crank end 110 by a conventional screw 118. The shaft 14 is rotatably mounted in the housing, with bearing shank 104 positioned in a bearing 120, which is in turn positioned in shaft aperture 76. The other end of shaft 14 has its bearing portion 106 rotatably mounted in a bearing 122, which is positioned in the shaft aperture 47 of side 42.

Drum 16 is also a die-case aluminum part in this instance. The drum includes a relatively flat circular base 124, which has a ratchet wheel 126 formed integral with its outer periphery. Base 124 includes a plurality of holes 128 to lighten the weight of the drum. The drum includes a plurality of intermittent side walls 130 of the drum to provide a shackle receptacle. A cable holder 132 is formed integral with the base 124. The cable holder includes a cylindrical ball recess 134 and a cable wall 136.

The flexible shackle 20 is, in this instance, approximately 6 feet long; but any appropriate length may be used. Shackle 20 includes a conventional stranded steel cable, which is covered with a polyvinyl chloride coating. A ball 138 is swaged onto one end of the cable. The ball is positioned in recess 132. The ball is held in the recess by forming a crimp 140 in the wall of the ball recess to prevent the ball from coming out. A cable stop 141 is crimped to the cable adjacent to the free end thereof to hold the free end exteriorly of the housing.

The lock pin 22 is fixed to the free end of the flexible shackle. Lock pin 22 includes a post 142, having a rounded end 144. The post has a lock slot 146. A flared head 148 is formed integral with the post 142. A dog 150 is formed integral with post 142 between the lock slot and the head. The lock pin contains a cable aperture 152, which receives the free end of the cable. The cable is held in the aperture 152 by crimping slightly the pin to compress aperture 152.

The lock 24 is conventional in its construction; and includes a threaded body 154, with a nut 156 holding the body in place. A cam 158 is connected to the lock; and includes an arm 160 and a head 162, which is positionable in the lock slot 146.

The support plate 26 is of a thin material; and includes a body 164, with an upper head 166 formed integral with the upper end and a lower head 168 formed integral with the lower end.

The lock 10 is mounted on a bicycle frame, such as on the seat post 32 of the bicycle frame, by positioning the pedestals on opposite sides of the post. The support plate is then positioned against the post. Fasteners 170 are used to secure the support plate to the post. The fasteners are one-way fasteners in that they may be driven in, but may not be driven out. The support plate is of a flexible material, so that it may adapt itself to posts of varying sizes, but still keep the lock snug up against the post.

When the bicycle is to be locked, the lock pin 22 is removed from the housing, and is pulled to pull out a sufficient amount of flexible shackle. The bicycle lock is positioned so that the cable being discharged from the shackle receptacle comes out through the rear fork. It may be placed through the rear wheel; and, if desired, it may also be placed through a front wheel. The cable then may be wrapped around a post 172, or other selected permanent device. The free end of the cable is then locked to the housing.

The lock pin is inserted into the keyhole-shaped aperture 80, so that the post is positioned in aperture 56. Lock 24 is then manipulated with a key in a conventional manner so that the cam arm is moved upward to place head 162 into lock slot 146. Dog 150 of the lock pin is positioned adjacent to the ratchet wheel 146, and is urged toward the ratchet wheel by the cable. Bending of the cable to insert the lock pin into the lock pin aperture creates a torsion force on the end of the cable, which force urges the dog toward the ratchet wheel. The crank 18 may be manipulated to rotate the drum, therby rotating the ratchet wheel past the dog 150 so as to wind the flexible shackle onto the drum. However, the flexible shackle may not be pulled off the drum since the dog prevents the drum from unwinding flexible shackle off the drum.

To unlock the bicycle, a key is inserted into lock 24; and the key is turned to rotate the cam arm 160 to disengage the lock pin. The lock pin may then be removed from the housing. The cable is then disengaged from the other portions of the bicycle, and the post 172. The crank is used to rotate the drum to wind the flexible shackle onto the drum. Once the cable is wound up into the drum, the flexible shackle is thus stored in the housing. Stop 141 prevents all of the flexible shackle and the lock pin from being pulled into the housing. The lock pin is inserted into the keyhole aperture 80. The lock is manipulated with a key to place the head 162 into the slot 146. The crank is rotated to further wind up the flexible shackle so that it is taut. Thus, the flexible shackle is secure in the housing. None may be pulled out and become entangled with the bicycle while the bicycle is in operation.

It may be appreciated that the present bicycle lock requires the key for the operation of the bicycle lock, so that the bicycle will not be locked by an unauthorized person. It may be appreciated that any sufficient length of flexible cable may be used. However, it has been found that a length of approximately six feet is the desired length.

Although a specific embodiment of the herein-described invention has been described in detail above, it is readily apparent that those skilled in the art may make various modifications and changes without departing from the spirit and scope of the present invention. The instant invention is limited only by the appended claims.

What is claimed is:

1. A bicycle lock, comprising: a housing, a mount for securing the housing to a portion of a bicycle, a shackle receptacle rotatably mounted in the housing, an elongated flexible shackle having one end fixed to the shackle receptacle and the other end being free, said elongated flexible shackle being windable upon the shackle receptacle for storage thereon, a ratchet wheel fixedly connected to the shackle receptacle for rotation therewith, a lock pin connected to the free end of the flexible shackle and being releasably positionable in the housing, said lock pin having a dog selectively cooperative with the ratchet wheel to limit rotation of the ratchet wheel and the shackle receptacle to one direction for winding the flexible shackle onto the receptacle, and a lock mounted in said housing and being selectively engageable with the lock pin to hold the lock pin in the housing with the dog in a position for engagement with the ratchet wheel.

2. A bicycle lock as defined in Claim 1 wherein the elongated flexible shackle is a stranded cable and the stranded cable is twisted slightly upon insertion of the lock pin into the housing, thereby constantly urging the dog into engagement with the ratchet wheel.

3. A bicycle lock as defined in claim 1 wherein the housing includes two halves, said lock pin being positionable in the housing through one half and said lock being mounted in the other half, whereby locking of the lock to the lock pin locks the two halves together.

4. A bicycle lock as defined in claim 1 wherein the mount includes a support plate being deformable to accommodate the plate to a portion of the bicycle.

5. A bicycle lock as defined in claim 1 wherein the shackle receptacle includes an open-ended ball receiver, said elongated flexible shackle includes a stranded cable having a ball fixed at the one end, which is fixed to the shackle receptacle, said ball being positioned in the ball receiver, said open-ended ball receiver having a portion bent over to lock the ball into the ball receiver.

6. A bicycle lock as defined in claim 1 wherein the housing includes two halves, said lock pin being positionable in the housing through one half, said lock being mounted in the other half, whereby locking of the lock to the lock pin locks the two halves together, said shackle receptacle includes an open-ended ball receiver, said elongated flexible shackle includes a stranded cable having a ball fixed at the one end which is fixed to the shackle receptacle, said ball being positioned in the ball receiver, said open-ended ball receiver having a portion bent over to lock the ball into the ball receiver, said mount includes a support plate being deformable to accommodate the plate to a portion of the bicycle.

7. A bicycle lock as defined in claim 1 wherein the mount includes a support plate being deformable to accommodate the plate to a portion of the bicycle, and the housing includes two halves, said lock pin being positionable in the housing through one half and said lock being mounted on the other half, whereby locking to the lock pin locks the two halves together.

8. A bicycle lock as defined in claim 1 wherein the elongated flexible shackle is a stranded cable and the cable is twisted slightly upon insertion of the lock pin into the housing, thereby constantly urging the dog into engagement with the ratchet wheel, and the housing includes two halves, said lock pin being positionable in the housing through one half, and said lock being mounted in the other half, whereby locking of the lock to the lock pin locks the two halves together.

9. A bicycle lock as defined in claim 1 wherein the mount utilizes a support plate being deformable to accommodate the plate to a portion of the bicycle, said shackle receptacle includes an open-ended ball receiver, said elongated flexible shackle includes a stranded cable having a ball fixed at the one end which is fixed to the shackle receptacle, said ball being positioned in the ball receiver, said open-ended ball receiver having a portion bent over to lock the ball into the ball receiver.

10. A bicycle lock as defined in claim 1 wherein the shackle receptacle includes an open-ended ball receiver, said elongated flexible shackle includes a stranded cable, said stranded cable having a ball fixed at the one end which is fixed to the shackle receptacle, said ball being positioned in the ball receiver, said open-ended ball receiver having a portion bent over to lock the ball into the ball receiver, said stranded cable being twisted slightly upon insertion of the lock pin into the housing, thereby constantly urging the dog into engagement with the ratchet wheel.

11. A bicycle lock as defined in claim 1 wherein the mount includes a support plate being deformable to accommodate the plate to a portion of the bicycle, said housing includes two light-weight die-cast halves, said lock pin being positionable in the housing through one half, said lock being mounted in the other half, whereby locking the lock to the lock pin locks the two halves together, said elongated flexible shackle includes a stranded cable coated with a soft plastic material, said stranded cable is twisted slightly upon insertion of the lock pin into the housing, thereby constantly urging the dog into engagement with the ratchet wheel, said shackle receptacle includes an open-ended ball receiver and a plurality of intermittent side walls, said elongated flexible shackle includes a ball fixed to the end of the cable opposite to the end having the lock pin, said ball being positioned in the ball receiver, said open-ended ball receiver having a portion bent over to lock the ball into the ball receiver.

12. A bicycle lock, comprising: a housing, said housing having a die-cast open-interior left side and a die-cast open-interior right side registerable with the left side, each of said housing sides having a mounting pedestal; a support plate secured to the mounting pedestals for locking the housing to a bicycle frame; a shaft rotatably mounted in the housing, said shaft having one end rotatably mounted in the left side and the other end rotatably mounted in the right side; a crank fixed to one end of said shaft; a drum mounted on said shaft, said drum having a base having a plurality of ratchet teeth on said base, and a ball receiver connected to said base; a cable including a stranded body having a plastic coating on the exterior thereof, said cable including a ball on one end of the stranded body, said ball locked in said ball receiver, said cable being windable on said drum and extending exteriorly of said housing; a lock pin mounted on the other end of the stranded body, said lock pin including a post, a head, and a ratchet dog on said post engageable with the ratchet teeth of the drum; and a lock mounted on one side of the housing being releasably connectable to the lock pin for releasably holding the lock pin in the housing with the ratchet dog in a position for engagement with the ratchet teeth.

* * * * *